(12) United States Patent
Sherman et al.

(10) Patent No.: US 9,244,270 B1
(45) Date of Patent: Jan. 26, 2016

(54) AGILE CONFORMAL SCANNER

(71) Applicant: The Boeing Company, Chicago, IL (US)

(72) Inventors: William D. Sherman, Surprise, AZ (US); Jonathan M. Saint Clair, Seattle, WA (US); Barbara A. Capron, Sammamish, WA (US); Stephen K. Wilcken, Des Moines, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/525,642

(22) Filed: Oct. 28, 2014

(51) Int. Cl.
  *G02B 26/08* (2006.01)
  *G02B 26/10* (2006.01)
  *G02B 26/12* (2006.01)

(52) U.S. Cl.
  CPC ............... *G02B 26/10* (2013.01); *G02B 26/12* (2013.01)

(58) Field of Classification Search
  CPC .. G02B 26/0816; G02B 26/0833; G02B 6/32; G02B 26/10; G02B 26/12; G02B 6/3556; G02B 6/3526; G02B 6/35
  USPC ............ 359/201.2, 223.1–226.1, 290, 291; 372/14, 15, 20
  See application file for complete search history.

(56) References Cited

U.S. PATENT DOCUMENTS

| | | | |
|---|---|---|---|
| 6,102,294 A | 8/2000 | Swartz et al. | |
| 6,320,705 B1 | 11/2001 | Dube | |
| 6,636,653 B2 | 10/2003 | Miracky et al. | |
| 6,661,637 B2 | 12/2003 | McIntosh et al. | |
| 6,914,916 B2 * | 7/2005 | Pezeshki | G02B 6/32 372/14 |

FOREIGN PATENT DOCUMENTS

WO 2007061997 5/2007

OTHER PUBLICATIONS

McManamon, et al. "A Review of Phased Array Steering for Narrow-Band Electrooptical Systems", Proceedings of the IEEE, vol. 97, No. 6, Jun. 2009.
Apter, et al. "Continuously Controllable Wide-Angle Liquid Crystal Beam Deflector Based on the Transversal Field Effect in a Three-Electrode Cell". Optical Engineering, vol. 44 No. 5; May 2005.
Essex, Doug. "Tutorial on Optomechanical Beam Steering Mechanisms". Http://www.optics.arizona.edu/optomech, 2006.
Sullivan, Mark. "Synopsis of Risley Prism Beam Pointer". Lockhead Martin Space Systems, http://www.optics.arizona.edu/optomech/Fall06/reports, Nov. 2013.
MetaStable Instruments. "Beam Steering, How They Work". Http://www.metastableinstruments.com/.

* cited by examiner

*Primary Examiner* — Euncha Cherry
(74) *Attorney, Agent, or Firm* — Perman & Green, LLP (57) ABSTRACT

A wide angle scanning system includes a plurality of rotationally symmetrical transmissive optical elements each having a non-refracting surface and a refracting surface; and a mechanical beam steering system including micro-mechanical steering elements, each being coupled to a respective one of the plurality of rotationally symmetrical transmissive optical elements for rotating a respective rotationally symmetrical transmissive optical element about a center of rotation that coincides with a center of the non-refracting surface.

20 Claims, 11 Drawing Sheets

AGILE CONFORMAL SCANNER

BACKGROUND

Generally laser communications and laser sensors require the ability to very rapidly scan (e.g. direct) the laser beam(s) over a wide angle, i.e. such as when the scanner is used in the transmit mode. In the receive mode, the scanner needs to be able to very rapidly direct incoming light from any particular angle selected from a wide variation of angles. In addition, for target or source acquisition, the receive mode should initially start out in a wide-angle/stationary search mode in which all optical elements in the scanner are each pointed at a different angle. Then when a signal is acquired, all the scan elements are pointed in an optimal direction corresponding to the signal. This latter mode (e.g. focused mode) is needed in laser communications to increase both security and signal to noise ratio.

Focusing of the scanner so that all the scan elements are pointed in the optimal direction is generally obtained by beam steering where many small laser beams are combined by stacking and/or by super-positioning the small laser beams. However, directing the resultant combined laser beam involves movement of a large mass, such as with a gimbaled mirror system or a sheet of a lenslet array that provides slow response times. Deformable mirrors may also be employed for beam steering where small angular deviations can be made with the deformable mirrors however, these deformable mirrors are unable to provide wide angle, two-dimensional sweeps of a large diameter laser beam without any obstructions. Other systems for beam steering can also be utilized in scanners such as, for example, Risley prism mechanisms, beam steering mechanisms manufactured by Metastable Instruments, Inc. of Peters, Mo., USA and micro-opto-electro-mechanical chips. Liquid crystals can also employed for beam steering but the response time for liquid crystal beam steering is approximately tenths of a second with a fairly large beam divergence (e.g. tens of degrees).

It would be advantageous to have a wide angle scanning system in which small/low mass scan optics allow for fast response times when focusing the scanner in a predetermined direction.

SUMMARY

Accordingly, apparatus and method, intended to address the above-identified concerns, would find utility.

One example of the present disclosure relates to a wide angle scanning system including a plurality of rotationally symmetrical transmissive optical elements each having a non-refracting surface and a refracting surface; and a mechanical beam steering system including micro-mechanical steering elements, each being coupled to a respective one of the plurality of rotationally symmetrical transmissive optical elements for rotating a respective rotationally symmetrical transmissive optical element about a center of rotation that coincides with a center of the non-refracting surface.

One examples of the present disclosure relates to a method for wide angle scanning including inputting at least one optical beam into a plurality of rotationally symmetrical transmissive optical elements, where the plurality of rotationally symmetrical transmissive optical elements are micro-opto-electro-mechanical elements each having a non-refracting surface and a refracting surface; and steering the at least one optical beam with the plurality of rotationally symmetrical transmissive optical elements, with a mechanical beam steering system that includes micro-mechanical steering elements, about a center of the non-refracting surface to effect a predetermined field of regard.

One example of the present disclosure relates to a wide angle scanning system including an optically variable micro-opto-electro-mechanical lens array including a plurality of rotationally symmetrical transmissive optical elements each having a non-refracting surface and a refracting surface; and a mechanical beam steering system including micro-mechanical steering elements, each being coupled to a respective one of the plurality of rotationally symmetrical transmissive optical elements and being configured to rotate a respective rotationally symmetrical transmissive optical element about a center of rotation that coincides with a center of the non-refracting surface, the mechanical beam steering system effecting a change in field of view from a wide angle search field of view to a focused field of view where the plurality of rotationally symmetrical transmissive optical elements are focused in a common predetermined direction within a total field of regard.

BRIEF DESCRIPTION OF THE DRAWINGS

Having thus described examples of the disclosure in general terms, reference will now be made to the accompanying drawings, which are not necessarily drawn to scale, and wherein like reference characters designate the same or similar parts throughout the several views, and wherein:

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Figure 1:
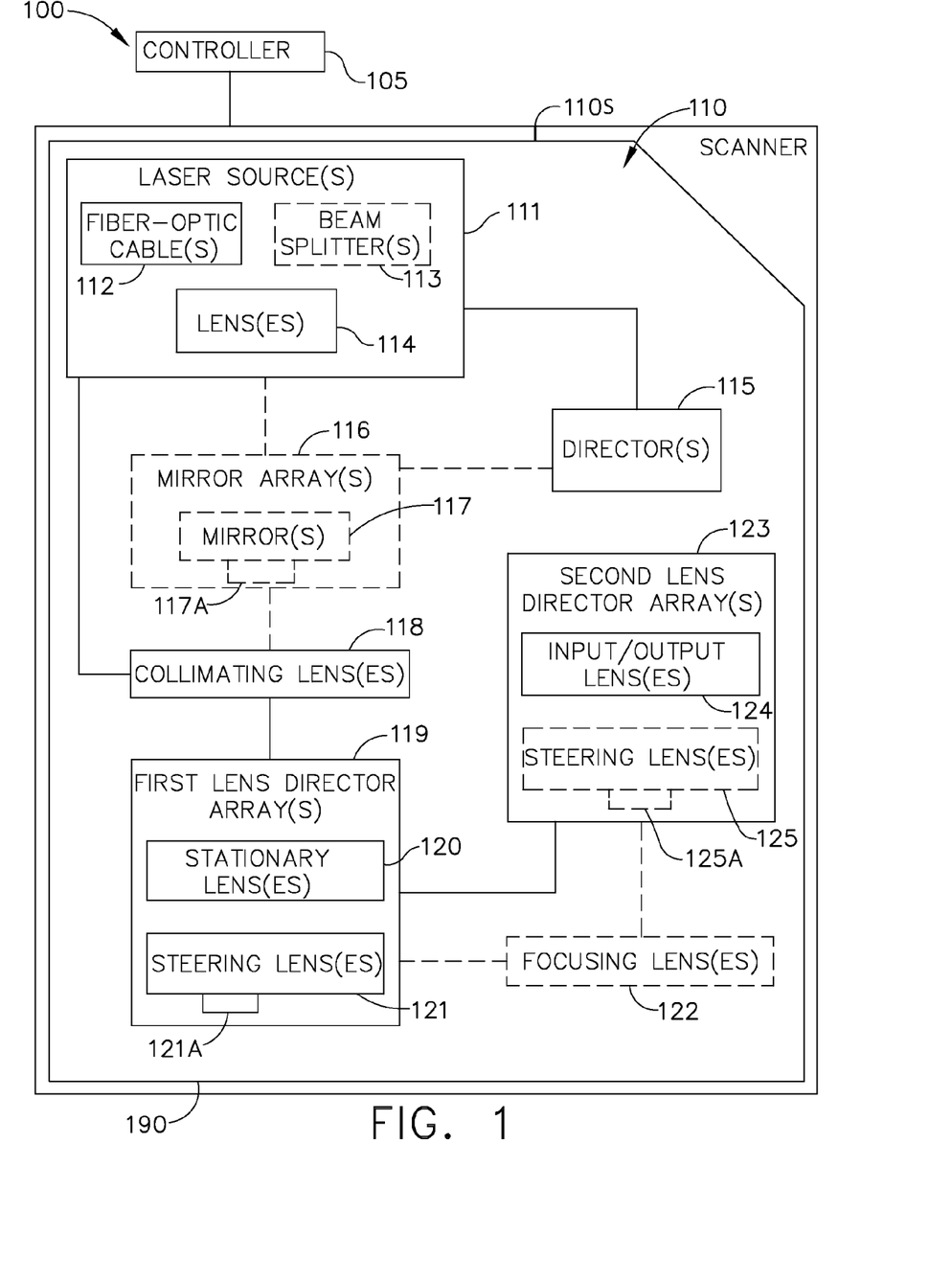
FIG. 1 is a block diagram of an agile conformal scanner according to aspects of the present disclosure.

Generally, referring to FIG. 1, with optical scanning systems, the scanner needs to rapidly control with controller 105 the direction of a number of distributed, low power optical beams which become incoherently or coherently combined (for lower scintillations) into a high power optical beam as they propagate through the atmosphere away from the transmitter of the scanner. The large diameter beam allows for smaller beam propagation diameters. Typically, a scanning/imaging system that steers a large diameter beam requires a large motorized mirror, making large scan angles impractical and high scan rates very difficult to achieve. To overcome this, the aspects of the disclosure employ arrays of very small elements (micro-machined elements) that are individually driven to create a high power large diameter beam from distributed light sources that allow the light sources and the resulting beam to be eye safe. Similarly, the aspects of the disclosure include distributed sensors (e.g. formed by conformal plates 110 described below) that allow for an effective diameter D1 (FIG. 9) of a receiving optical system to have a higher resolving power (e.g. with a smallest resolvable angle being less than 1°).

As may be realized, atmospheric scintillations require pointing adjustment of the scanner on a time scale of microseconds. In one aspect, to achieve response times on a microsecond time scale, the moving optical elements 117, 121, 125, described herein, are microscopic elements that have ultra-small masses (inertia). These moving optical elements are mounted on a respective actuator 117A, 121A, 125A of, for example, a micro-electro-mechanical system (MEMS) array which allows for the microsecond response times. As may be realized, in the receive mode of the scanner, the atmospheric scintillations also require pointing adjustments of the moving optical elements with a similar time scale, on the order of microseconds. As will be described herein, individual piston movement (e.g. linear back and forth movement) of at least some of the movable optical elements of the MEMS array allows for the adjustment of phase of all the beamlets 111B (a plurality of low power optical beams) to a desired value of a combined large diameter optical beam.

Referring still to FIG. 1, one example of the present disclosure relates to an agile conformal scanner 100 (referred to herein as scanner 100) that is light weight and has a substantially flat shape factor which is conformal to, for example, a structure to which the scanner 100 is mounted. As will be described herein, the agile conformal scanner provides for an obstruction free large variable field of regard (during a transmission mode where the field of regard ranges between less than a micro-radian to more than a steradian) and an obstruction free field of view (during a receiving mode). As used herein the term "field of regard" is all of the points that can be accessed (whether optical energy is exiting the system or entering the system) by both the optical prescription/geometry and the mechanical scanning, while the term "field of view" is all those points that can be accessed (whether optical energy is exiting the system or entering the system) by the optical prescription/geometry at a fixed scan angle. With respect to the aspects of the present disclosure there are as many fields of view as there are individual optical elements, and the optical elements can be aggregated to any suitable field of view within the field of regard. As will also be described herein the scanner 100 includes MEMS tip/tilt optical arrays mounted with rotationally symmetrical optical elements of very high refractive index where the scanner 100 rapidly directs (e.g. over large two-dimensional angles) a large diameter array of optical beams (e.g. that are combined in space as they propagate).

While the scanner 100 is conformally mounted to the structure, the scanner 100 allows for the scanning of a large diameter (approximately feet) array of combined laser beams, over very large angles (e.g. about ±70° or greater) in two dimensions (with the movement of as little as one optical element as described herein), in very short times (e.g. microseconds) with substantially no blockages in the field of regard, or when used in the receiving mode the field of view. The scanner 100 described herein, when in a receiving mode, also switches between a wide field of view (e.g. about ±70° or greater) to a narrow field of view (e.g. approximately 1 micro-radian or less) in any direction within the field of regard on a tie scale of tens of microseconds.

Still referring to FIG. 1 the scanner includes one or more conformal plates 110 each having a substrate 110S to which one or more micro-opto-electro mechanical (MOEMS) systems 190 are connected through, for example, at least one MEMS actuators formed on or otherwise affixed to the substrate 110S. In one aspect each MOEMS system 190 includes one or more of an optical beam source(s) 111, a mirror array (s) 116, collimating lens(es) 118, lens director arrays (beam steerers) 119, 123, focusing lens(es) 122 and one or more detectors 115. In one aspect the optical beam source 111 includes one or more fiber optic cable 112 and a lens 114 mounted to each fiber optic cable 112. As may be realized, the one or more fiber optic cables is coupled to a light source, such as a polarized laser or other light source, where the one or more fiber optic cables divides light from the light source into beamlets 111B as will be described in greater detail below. The lens 114, in one aspect, is a ball lens but in other aspects the lens 114 is any other suitable lens configured to direct the expanding beamlet 111B into, for example, the mirror array 116 in the manner described herein. In one aspect, a respective beam splitter 113 may be placed inline with each of the fiber optic cables 112 for directing a received signal to a detector 115 (when the scanner 100 is in a receiving mode) as will be described below.

The mirror array(s) 116 includes one or more mirrors 117 that are movably mounted to the substrate 110S so as to be linearly movable in a piston like manner. For example, each mirror 117 is linearly movable back and forth to control a phase of a respective beamlet 111B output from the lens 114. The one or more mirrors 117 are positioned relative to the lens 114 and one or more of the collimating lens 118 or detector 115 to direct the expanding beamlet 111B to the collimating lens 118 (when the scanner 100 is in a transmit mode) or to direct a return signal to the detector (when the scanner 100 is in a receiving mode). The collimating lens(es) 118 is any suitable lens configured to collimate the expanding beamlet 111B to allow the substantially parallel rays of the beamlet 111B to enter, for example, a first one of the lens director arrays 119.

The first one of the lens director arrays 119 includes a plurality of transmissive MOEMS lens directors each of which includes a transmissive stationary lens 120 and a transmissive steering lens 121. The combination of lenses 120, 121 is, in one aspect an afocal lens combination where an afocal lens combination is located at, for example, each tip/tilt site of a transmissive MEMS actuator array of the substrate 110S. In one aspect the afocal lens combination is a hemispherical lens system where the input to the lens system is collimated light at a fixed angle and the output is collimated light at a predetermined desired steered angle. The stationary lens 120 is connected to the substrate 110S in any suitable manner. The steering lens 121 is coupled to the substrate 110S through a MEMS actuator that is configured to rotate the steering lens 121 in one or more directions 221A, 222B (e.g. tip/tilt) about a center of curvature RP of its input surface 121S (see FIG. 1C). Referring also to FIG. 1C, in one aspect the steering lens 121 is a hemispherical lens with its center of curvature RP coinciding with its center of rotation while in other aspects the steering lens 121 has any suitable configuration for directing the beamlet 111B as described herein. Here the stationary lens 120 focuses the substantially parallel light beams from the collimating lens 118 at the center of curvature RP of the steering lens 121, which allows for a reduction in size and mass of the steering lens 121. The steering lens 121 has a high index of refraction and the input surface 121S of the steering lens 121 is always substantially perpendicular to the incoming light (e.g. regardless of the angle at which the lens 121 is rotated) so as to produce substantially no effect on (e.g. does not refract) the incoming light while the output surface 121E strongly refracts the light exiting lens 121. As will be described in greater detail below, there is at least one additional lens 122, 124, 125 disposed adjacent the afocal lens combination being configured to further diffract the steered beam from the steering lens 121 and/or to direct a beam of light back to the steering lens 121 (and ultimately to the detector 115).

Figure 1A:
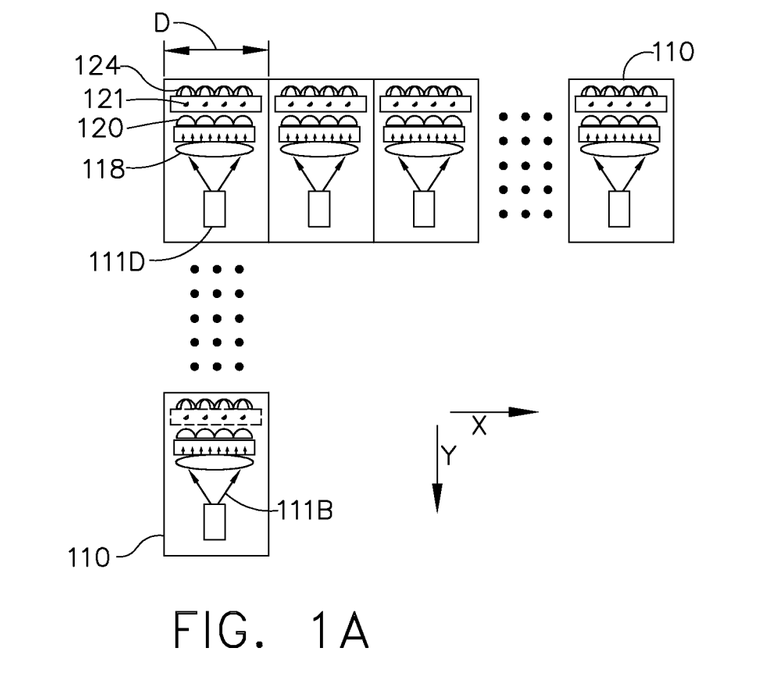
FIG. 1A is a schematic illustration of a portion of an agile conformal scanner according to aspects of the disclosure.
Figure 1B:
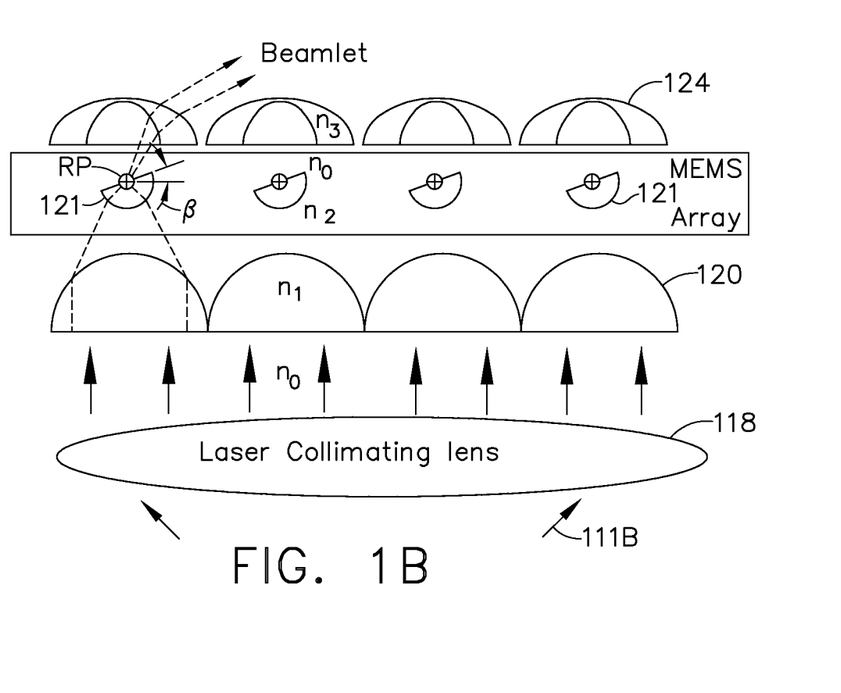
FIG. 1B is a schematic illustration of a portion of an agile conformal scanner according to aspects of the disclosure.
Figure 1C:
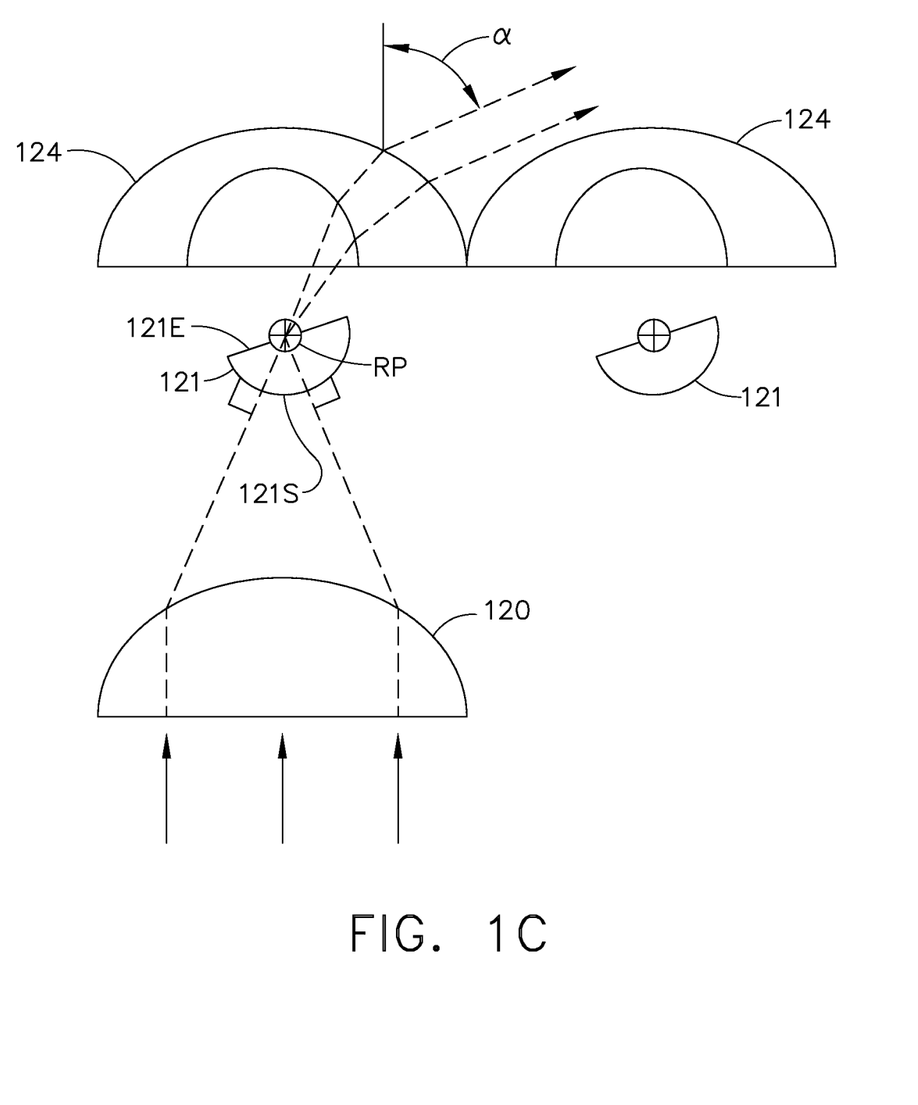
FIG. 1C is a schematic illustration of a portion of an agile conformal scanner according to aspects of the disclosure.

Referring to FIGS. 1A, 1B and 1C in one aspect the scanner 100 includes a plurality of conformal plates 110 arranged in a two dimensional grid or array (illustrated in FIG. 1A as lying substantially in the X-Y plane) which is disposed on a vehicle, such as aircraft 1102 or other suitable vehicle such as, for example, an automobile (or other ground vehicle), a ship or boat (or other maritime vehicle) and/or spacecraft (or other aerospace vehicle). The conformal plates 110 each have a small form factor with an aperture size D on the order of less than an inch (e.g. able to fit between structural members of the vehicle) so that when placed side by side in the two-dimensional array the scanner 100 conforms to the shape or contour of the vehicle's surface or skin 118S (see FIG. 9). Here each conformal plate 110 includes a laser source 111, collimating lens 118, an array of afocal lens combinations (or lens director arrays) 119 each having a stationary lens 120 and a steering lens 121 and an array of output lenses where each output lens corresponds to a respective afocal lens combination. In one aspect, a common laser source may provide any suitable laser light, such as polarized laser light, to each conformal plate 110 through fiber optic cables 112 or each conformal plate 110 may include its own laser diode 111D. Each conformal plate 110 also includes a detector 115 (FIG. 1) suitably positioned relative to, for example, the collimating lens so as to receive (in this aspect through, for example, a beam splitter 113 in line with the laser diode 111D) a return signal/beam when the scanner 100 is in a receive mode. As can be seen best in FIGS. 1B and 1C each laser diode (or described herein each fiber optic cable 112/lens 114 pair) emits a beamlet 111B of light that is collimated with the collimating lens 118. The collimated light enters each stationary lens 120 of the stationary lens array where each stationary lens directs a portion of the beamlet 111B to a respective steering lens 121. As the rotation point RP of the steering lens 121 is the center of curvature of the surface 121S, the angle at which the portion of the beamlets 111B interface with the surface 121S is constant (e.g. about 90 degrees). Each steering lens 121 is rotated about rotation point RP by a respective MEMS actuator 121A (FIG. 1) by an amount (e.g. angle f3) of up to about ±10° (in one aspect the steering lens is rotated more than about)±10° to steer the portion of the beamlet 111B to the output lens 124 where the output lens 124 further diffracts the steered beam to emit collimated light at a predetermined angle α of up to about ±70° (in one aspect the collimated light is emitted at an angle of more than about)±10°. As may be realized, the array of afocal lens combinations 119 and corresponding array of output lenses 124 has any suitable array size such as an array of about 64×64, about 80x80, about 256×256, about 1024× 1024 or any other suitable size. As may also be realized, the mechanical movement of the scanning optical element, e.g. steering lens 121 (and steering lens 125 described below), involves a very small mass that can be quickly accelerated (e.g. about 10,000 times faster than the heavy mass of a large gimbaled pointing mirror that generally takes about a second to drive over its range of motion).

Figure 2:
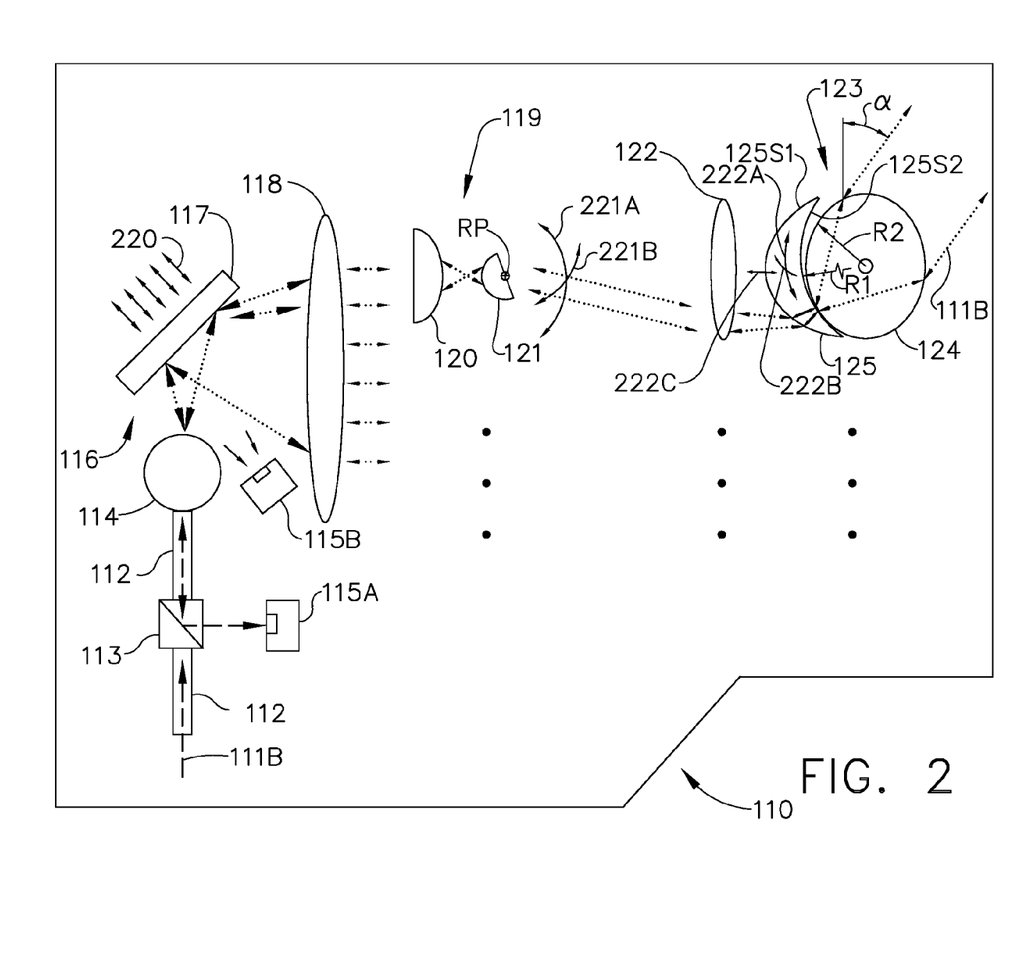
FIG. 2 is a schematic illustration of a portion of an agile conformal scanner according to aspects of the disclosure.
Figure 3:
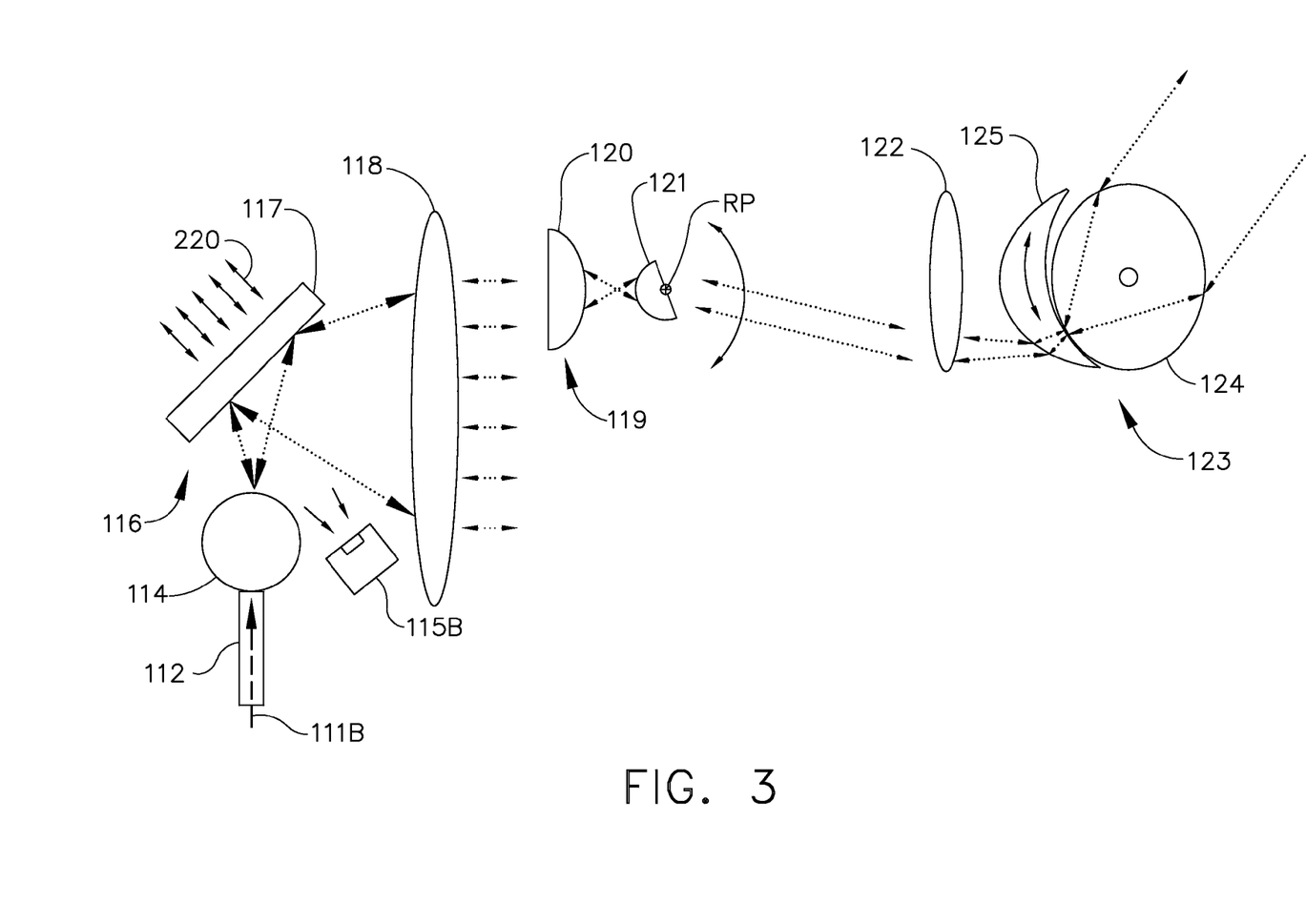
FIG. 3 is a schematic illustration of a portion of an agile conformal scanner according to aspects of the disclosure.
Figure 6:
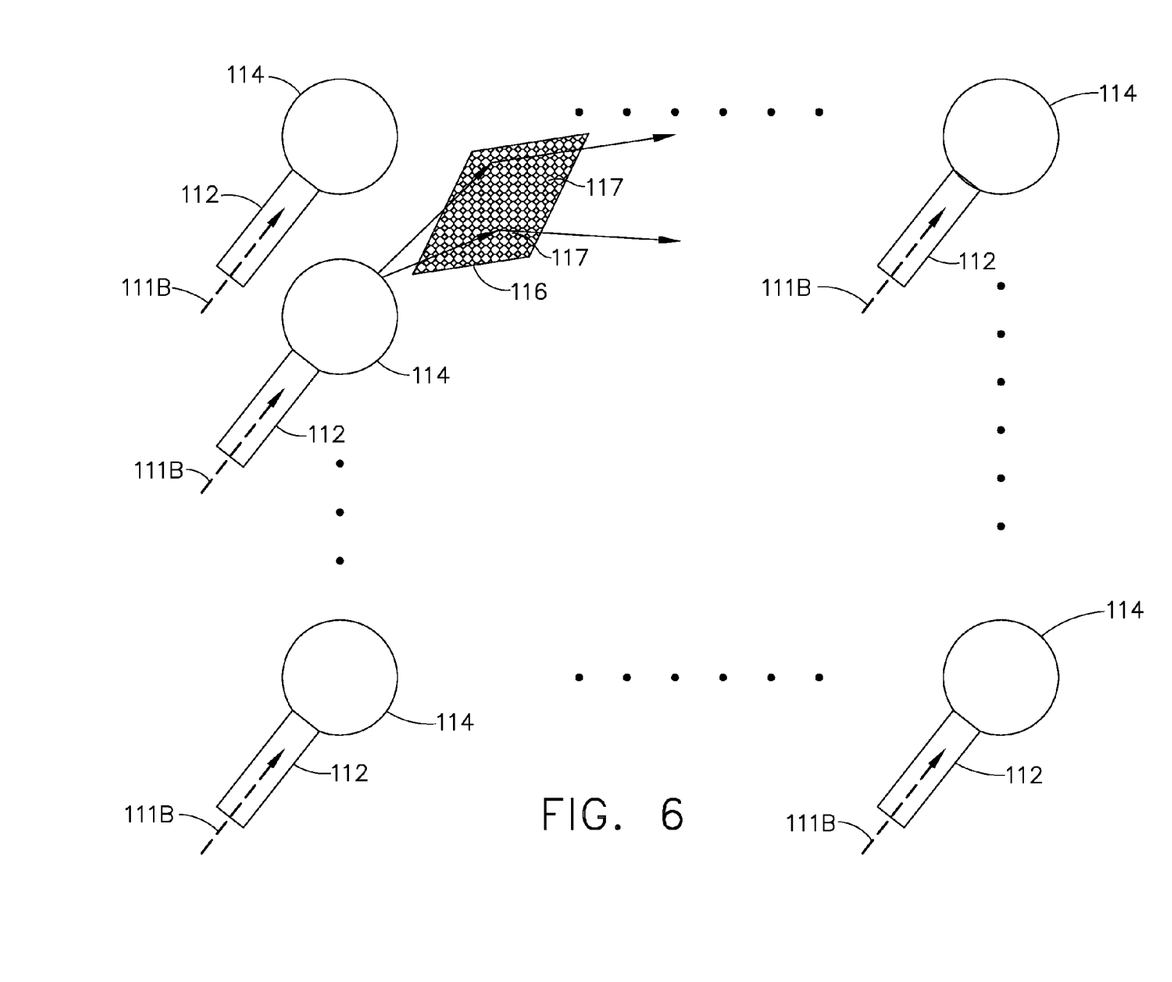
FIG. 6 is a schematic illustration of a portion of an agile conformal scanner according to aspects of the disclosure.

Referring to FIGS. 2 and 3 in one aspect, as described above, each conformal plate 110 includes a common laser source 111 coupled to each conformal plate 110 through a fiber optic cable 112. In this aspect a beam splitter 113 is disposed in line with the fiber optic cable for directing a return signal (when the scanner is operated in a receive mode) to the detector 115A. A ball lens 114 (or any other suitable lens) is arranged at an output of the fiber optic cable 112 so as to direct the expanding beamlet 111B of, for example, polarized laser light to the MEMS mirror array 116. In one aspect, a single fiber optic cable 112/lens 114 combination is common to a plurality of mirrors 117 in the array of mirrors 116 as illustrated in FIG. 6 while in other aspects a fiber optic cable 112/lens 114 combination is provided for each of the plurality of mirrors 117 in the array of mirrors 116. In another aspect each mirror 117 is mounted to a MEMS actuator 117A so as to be at least linearly movable in the direction of arrow 220 in a reciprocating piston-like movement to control a phase of a respective portion of the beamlet, e.g. reflected off the mirror 117, as the beamlet 111B continues to expand to the collimating lens 118. In one aspect, as illustrated in FIG. 2, the mirror 117 is positioned to direct light from the lens 114 to the collimating lens 118 when the scanner 100 is in the transmit mode and to direct light from the collimating lens 118 to the lens 114 when the scanner 100 is in the receiving mode. Here, the return signal/light beamlet is directed to the detector 115A by the beam splitter 113. In another aspect, as illustrated in FIG. 3 the mirror 117 is positioned to direct light from the lens 114 to the collimating lens 118 when the scanner 100 is in the transmit mode and to direct light from the collimating lens 118 to the detector 115B when the scanner 100 is in the receiving mode (the beam splitter 113 is not disposed in line with the fiber optic cable 112). In other aspects, as also illustrated in FIG. 2 the mirror 117 is positioned to direct light from the collimating lens 118 to one or more of the detector 115A, 115B when the scanner 100 is in the receiving mode.

Figure 5:
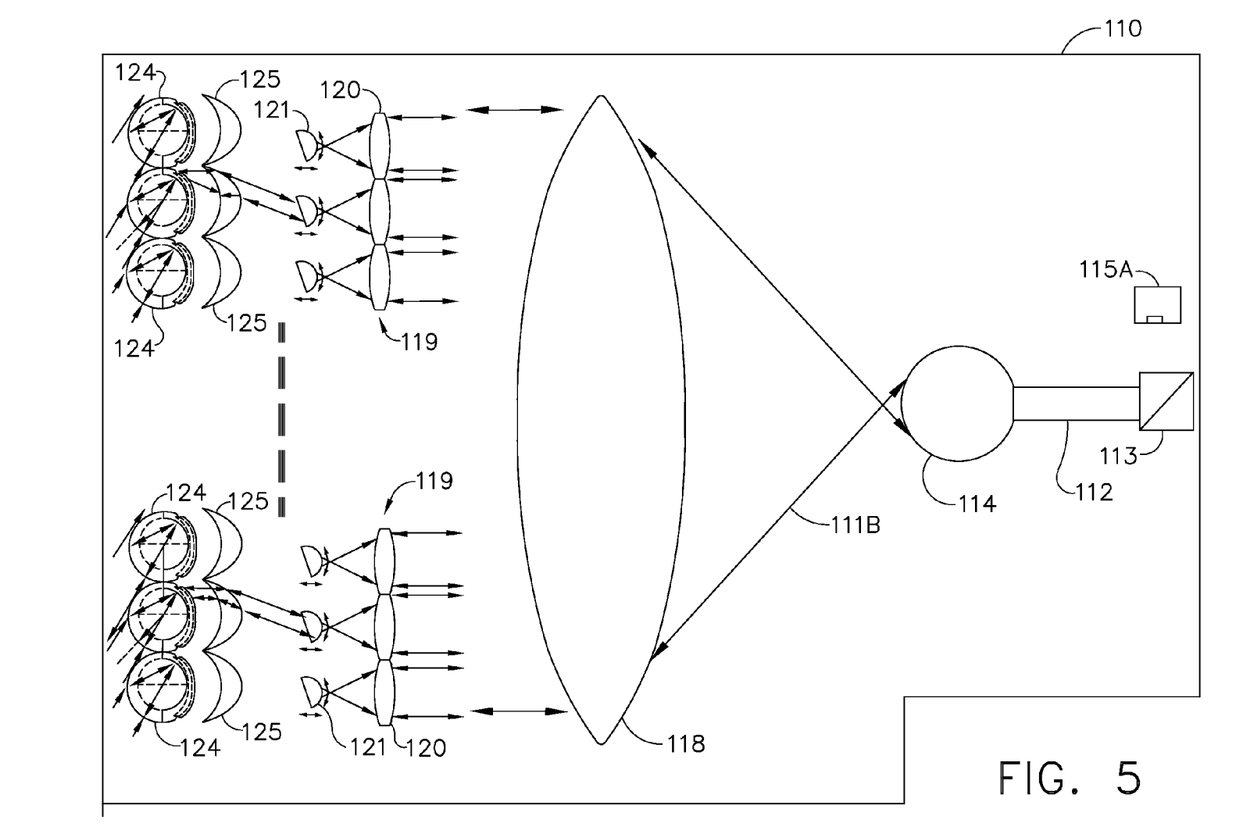
FIG. 5 is a schematic illustration of a portion of an agile conformal scanner according to aspects of the disclosure.

Collimated light from the collimating lens 118 is directed to the array of afocal lens combinations 119 as described above and as illustrated in FIG. 5. In this aspect, each conformal plate includes an array of focusing lenses 122 where each focusing lens 122 is provided for each of the afocal lens combinations 119 (in other aspects a focusing lens 122 is provided for more than one afocal lens combination 119). Here the steering lens 121 rotates (e.g. tips/tilts) about rotation point RP in the direction of one or more of arrows 221A, 221B to direct a respective portion of the beamlet 111B to a predetermined/unique position on the focusing lens 122 such that the converging beam output from the focusing lens 122 is directed to another lens combination (or lens director array) 123 that includes a steering lens 125 having a high index of refraction and an output lens 124 having a low index of refraction. Each steering lens 125 is mounted to a respective transmissive MEMS actuator 125A so as to rotate and linearly move in at least the directions of arrow 222A, 222B, 222C (e.g. tip/tilt/piston movement) relative to output lens 124. Here the steering lens 125 is any suitable lens, such as a meniscus focusing lens having a first surface 125S1 and a second surface 125S2 through which light passes. In one aspect the second surface 125S2 has a radius of curvature R1 that is larger than a radius of curvature R2 (by any suitable amount) of the output lens 124 such that the tip/tilt/piston movement of the steering lens 125 keeps the steering lens 125 in substantial point contact with the output lens 124. As may be realized, a line through the point of contact between lenses 124, 125 and a center of the output lens 124 (which is any suitable lens such as a spherical lens) determines the two dimensional output direction of the beamlet 111B. As may also be realized, the contact point between the moving/rotating steering lens 125 and the output lens 124 acts as a directional spatial filter based on, for example, the principal of Newton's Rings (e.g. center spot transmissive). In one aspect the rotational movement of steering lenses 121, 125 is synchronous movement (e.g. the movement of steering lens 121 is linked to the movement of steering lens 125) while in other aspects the rotational movement of the steering lenses 124, 124 is independent of each other.

FIG. 6 illustrates another conformal plate 110 of the scanner 100 in accordance with an aspect of the disclosure. In this aspect the lens 114 and collimating lens 118 are arranged so that the beamlet 111B is directed from the lens 114 directly to the collimating lens 118. Here the collimating lens 118 and the lens director arrays 119, 123 are arranged relative to each other so as to optimize the beamlet transmission to and from a point of interest/focus a predetermined distance from the scanner 100.

Figure 4:
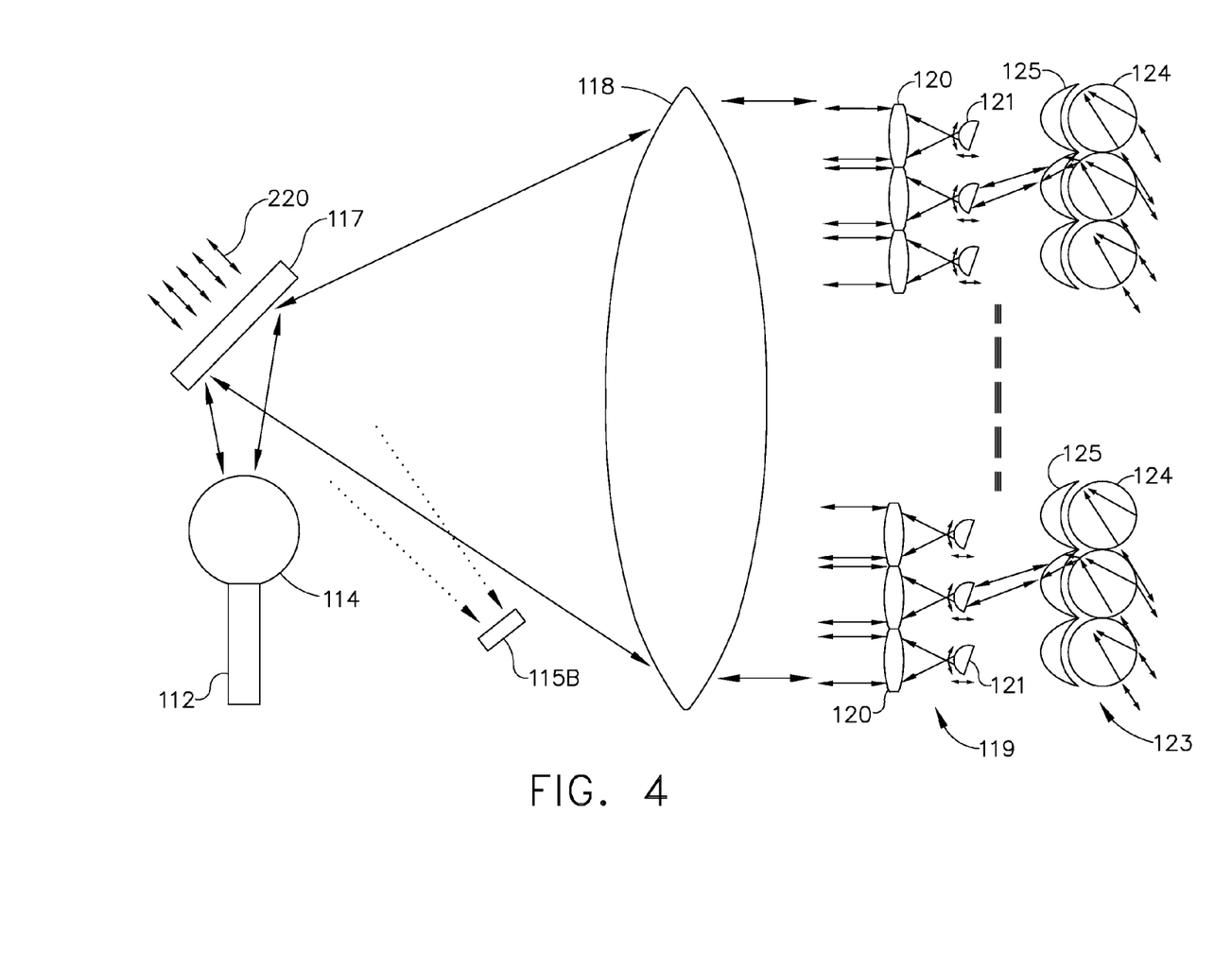
FIG. 4 is a schematic illustration of a portion of an agile conformal scanner according to aspects of the disclosure.
Figure 7:
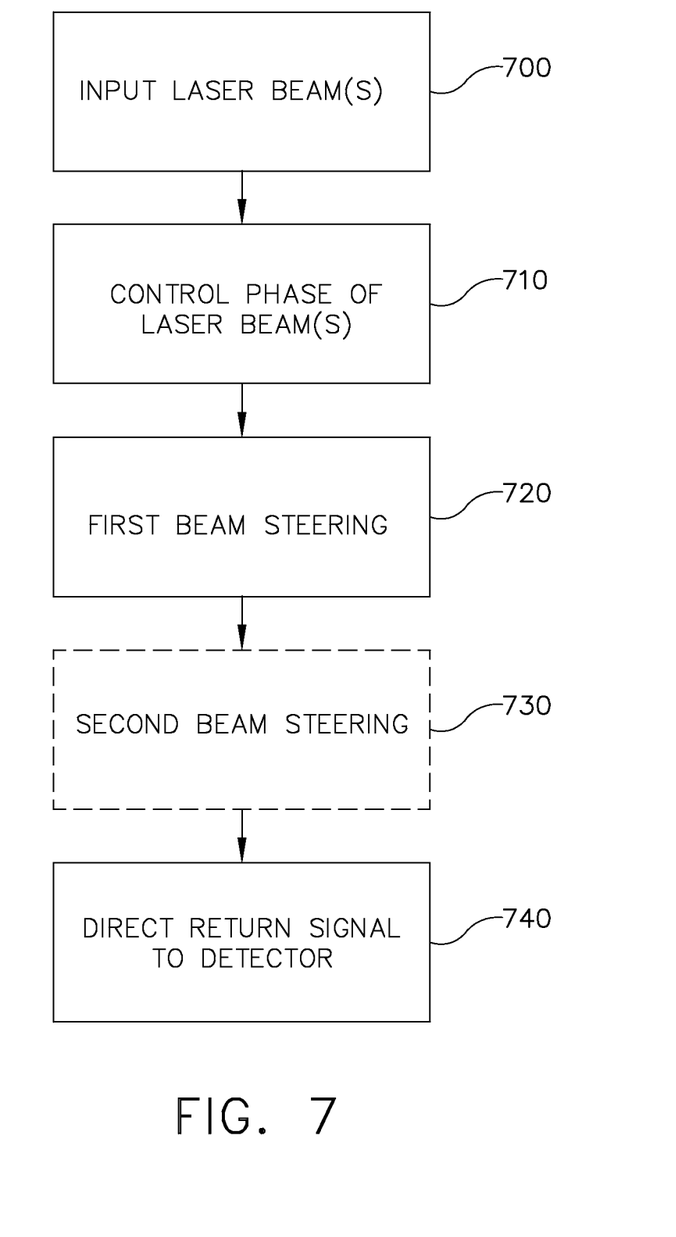
FIG. 7 is a flow diagram according to aspects of the disclosure.

Referring now to FIG. 7, in operation a light source (e.g. beamlet), such as a polarized laser light, is input to the conformal plate 110 (FIG. 7, Block 700). The phase of the light source is controlled (FIG. 7, Block 710) by controller 105 in any suitable manner such as through the mirrors 117 in the array of mirrors 116 (see e.g. FIGS. 2-4) or by positioning the lens 114 relative to the collimating lens 118 in a predetermined location (see e.g. FIG. 5). The collimated light beams are steered through the first lens director array(s) 119 in the manner described above (FIG. 7, Block 720) so that the light beams are ultimately directed to and output by the output lens 124 in a predetermined two-dimensional direction. In one aspect the light beams are directed by the first lens director array(s) 119 to the second lens director array(s) 123 where the light beams are steered (FIG. 7, Block 730) a second time so as to be output by output lens 124 in a predetermined two-dimensional direction in the manner described above. As may be realized, when the scanner 100 is in a transmit mode, each beamlet from the output lenses 124 is combined with other beamlets either incoherently or coherently and directed in a predetermined direction so as to scan a solid angle of about ±70° or more in two dimensions, in very short times, with substantially no blockages in the field of regard.

In other aspects, a return signal (e.g. light beam) is directed back into the scanner 100 where the return signal enters the output lens 124 and travels in a direction substantially opposite to the direction of travel when the scanner 100 is in the transmit mode (see the bi-directional arrows indicating the direction of light travel in the Figs.) so as to be directed to one or more of the detectors 115A, 115B (FIG. 7, Block 740). As may be realized, the return signal (e.g. due to the principle of reciprocity) flows back along the same outgoing path, on the condition that the MOEMS actuators have not moved the steering lenses 121, 125 and/or mirror 117 during the transit time of the laser beam travelling out and back from a predetermined target. In one aspect, the mirror(s) 117 are controlled during the transit time to focus the return signal onto the selected corresponding wavelength imaging detector 115B. In other aspects, the mirror(s) 117 remain fixed (e.g. do not move) during the transit time so that the return signal enters back into the lens 114/fiber optic cable 112 combination where the beam splitter 113 (such as a polarizing beam splitter) reflects the return signal to the detector 115A. Here the scanner may have a wide angle field of view substantially similar to the field of regard (e.g. the solid angle of about ±70° in two dimensions) and each of the optical elements are positioned in a predetermined direction for detection of a portion of the wide angle image. However, in one aspect, the low mass of the optical elements effects an optically variable scanning/imaging system that provides a change in the field of view to less than ±70° (e.g. to a field of view of about less than 1 micro-radian) within a time frame of tens of microseconds where it is desired to focus the scanner (on or off axis of the scanner) in any predetermined direction within the field of regard to "zoom in" on a predetermined location/feature such as to image and event such as, for example, a munitions blast while the event is still in progress, allowing for interrogation of the event with all scanning elements pointing in the same direction to the same distant source. This focused mode of operation results in a high signal-to-noise ratio and also higher resolution than other scanning systems due to, for example, the sensor pixels/laser source locations being distributed over a large area (e.g. on the order of square feet).

As described herein, the packaging of the conformal plates 110 of the scanner 100 and the laser source (e.g. comprised of beamlets) is made compact through the use of individually driven transmissive optical elements 117, 121, 125 and MEMS actuators (however, in other aspects reflective optical elements and MEMS actuators may be used). The optical path of the scanner is serial in nature such that the light serially travels from the light source 111, to the mirror(s) 117 (if provided) and through each of the lens elements 118, 120, 121, 122, 125, 124 and vice versa when the scanner 100 is in the transmit and receive modes. The conformal aspect of the scanner 100, as described above, allows the scanner to conformally mount on the side of a structure/vehicle for (1) scanning, in a transmit mode, a large diameter (e.g. on the scale of feet) array of combined laser beams over continuous large/wide two dimensional solid angles of about ±70° or more with no blockages in the field of regard, and (2) when used in a receiving mode, imaging of a wide field of view (substantially similar to that of the field of regard) with the capability to quickly switch (e.g. within tens of microseconds) to a very narrow field of view (e.g. less than 1 microradian) in any direction within the field of regard. As an example of the conformal nature of the scanner 100, when the scanner is mounted to, for example, the side of an aircraft 1102 the large diameter cutout conventionally needed for a large gimbaled mirror in the skin 118S of the aircraft 1102 is replaced with many small spaced holes/apertures 110A (see FIG. 9, e.g. disposed in an array of apertures 110A where each aperture is formed by the output lenses 124 of the conformal plates 110) placed over a large area, so as to minimize any reduction in structural integrity of the skin 118S.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Figure 8:
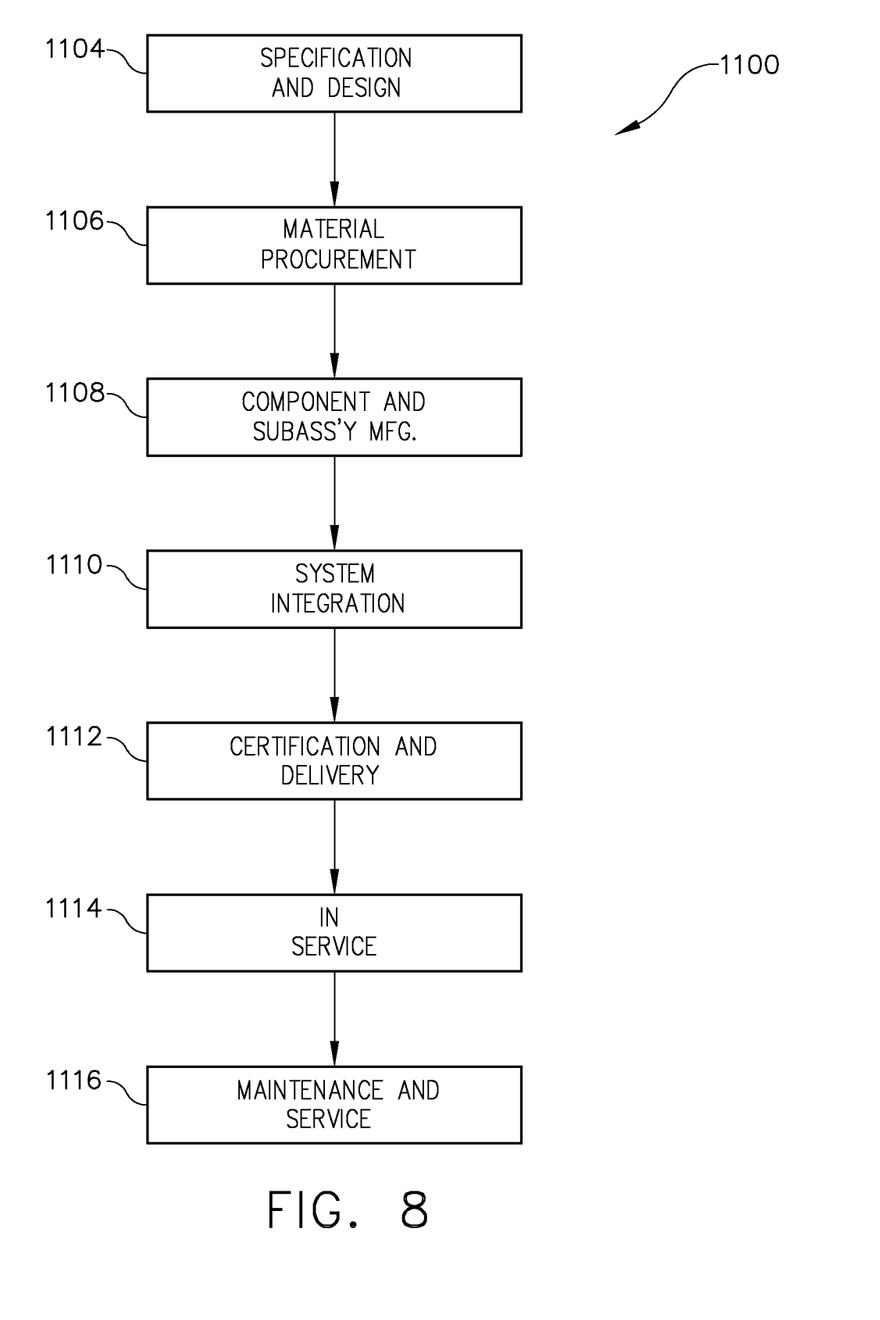
FIG. 8 is a flow diagram of aircraft production and service methodology.
Figure 9:
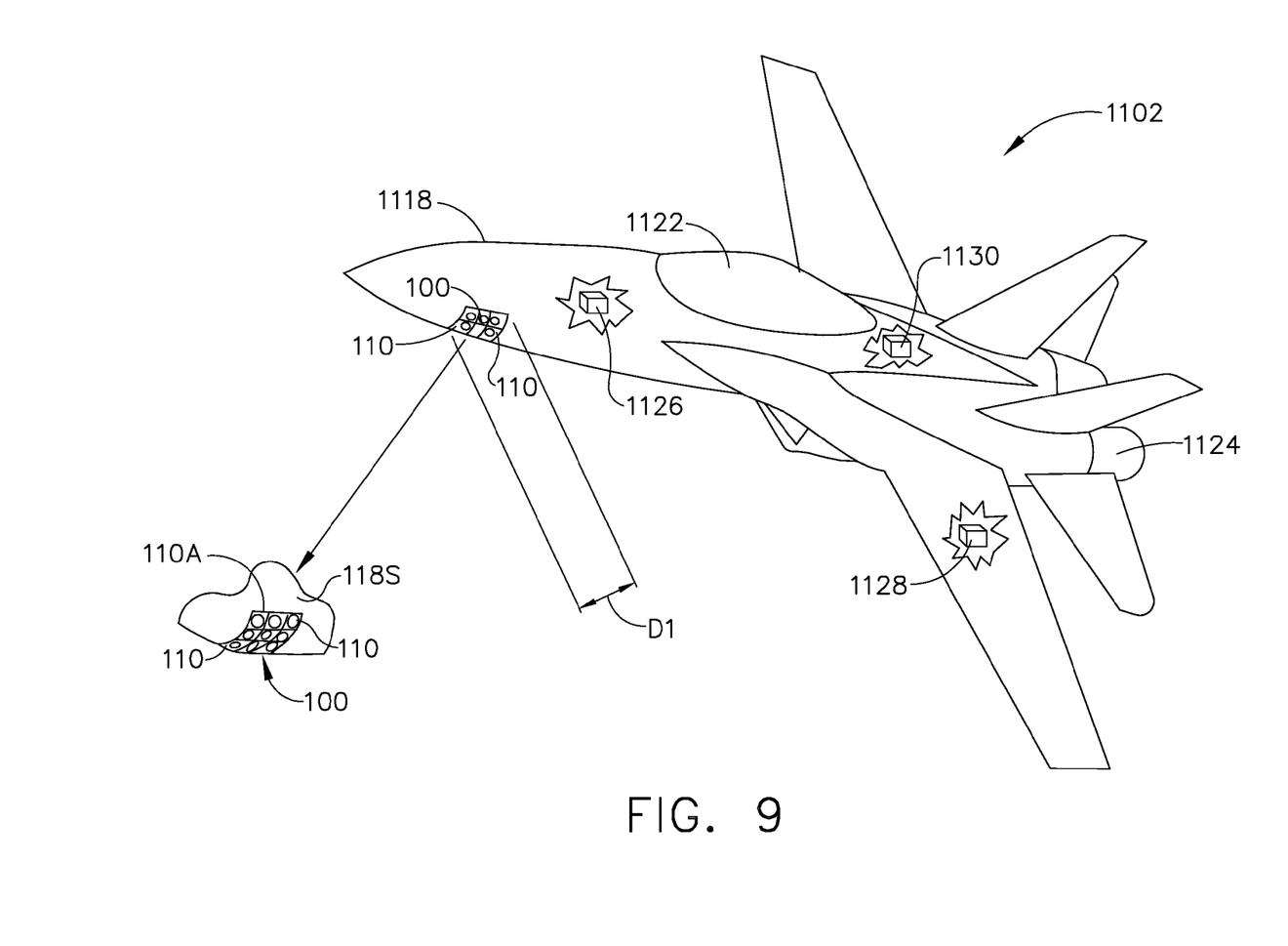
FIG. 9 is a schematic illustration of an aircraft.

Examples of the disclosure may be described in the context of an aircraft manufacturing and service method 1100 as shown in FIG. 8 and an aircraft 1102 as shown in FIG. 9. During pre-production, illustrative method 1100 may include specification and design 1104 of the aircraft 1102 and material procurement 1106. During production, component and subassembly manufacturing 1108 and system integration 1110 of the aircraft 1102 take place. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, the aircraft 1102 produced by the illustrative method 100 may include an airframe 1118 with a plurality of high-level systems and an interior 1122. Examples of high-level systems include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the aircraft 1102 is in service. Also, one or more aspects of the apparatus, method, or combination thereof may be utilized during the production states 1108 and 1110, for example, by substantially expediting assembly of or reducing the cost of an aircraft 1102. Similarly, one or more aspects of the apparatus or method realizations, or a combination thereof, may be utilized, for example and without limitation, while the aircraft 1102 is in service, e.g., maintenance and service 1116.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

In accordance with one or more aspects of the present disclosure a wide angle scanning system includes a plurality of rotationally symmetrical transmissive optical elements each having a non-refracting surface and a refracting surface; and a mechanical beam steering system including micro-mechanical steering elements, each being coupled to a respective one of the plurality of rotationally symmetrical transmissive optical elements for rotating a respective rotationally symmetrical transmissive optical element about a center of rotation that coincides with a center of the non-refracting surface.

In accordance with one or more aspects of the present disclosure the micro-mechanical steering elements rotate the respective one of the plurality of rotationally symmetrical transmissive optical elements to effect a field of view or field of regard having a solid angle of about ±70°.

In accordance with one or more aspects of the present disclosure the micro-mechanical steering elements rotate the respective one of the plurality of rotationally symmetrical transmissive optical elements through an entire range of rotation in a $1 \times 10^{-2}$ second period.

In accordance with one or more aspects of the present disclosure the plurality of rotationally symmetrical transmissive optical elements comprise micro-opto-electro-mechanical systems.

In accordance with one or more aspects of the present disclosure the plurality of rotationally symmetrical transmissive optical elements and the mechanical beam steering system comprise at least one conformal panel element, the wide angle scanning system further comprising at least one laser source corresponding to each scanning panel element.

In accordance with one or more aspects of the present disclosure the plurality of rotationally symmetrical transmissive optical elements and the mechanical beam steering system comprise at least one conformal panel element, the wide angle scanning system further comprising at least one laser source that is common to the at least one scanning panel element.

In accordance with one or more aspects of the present disclosure the wide angle scanning system further includes at least one laser source and at least one micro-mechanical system mirror, the at least one micro-mechanical system mirror being linearly movable to effect phase control of a laser beam emitted by the at least one laser source for entry into the a plurality of rotationally symmetrical transmissive optical elements.

In accordance with one or more aspects of the present disclosure the plurality of rotationally symmetrical transmissive optical elements have a high index of refraction.

In accordance with one or more aspects of the present disclosure the wide angle scanning system further includes at least one laser source that effects creation of multiple beamlets for input into the plurality of rotationally symmetrical transmissive optical elements.

In accordance with one or more aspects of the present disclosure the wide angle scanning system further includes a plurality of lenses coupled to the at least one laser source where each of the plurality of lenses directs a beamlet into the plurality of rotationally symmetrical transmissive optical elements.

In accordance with one or more aspects of the present disclosure the plurality of rotationally symmetrical transmissive optical elements form a first beam steering element, the wide angle scanning system including a plurality of rotational optical elements that form a second beam steering element.

In accordance with one or more aspects of the present disclosure a method for wide angle scanning includes inputting at least one optical beam into a plurality of rotationally symmetrical transmissive optical elements, where the plurality of rotationally symmetrical transmissive optical elements are micro-opto-electro-mechanical elements each having a non-refracting surface and a refracting surface; and steering the at least one optical beam with the plurality of rotationally symmetrical transmissive optical elements, with a mechanical beam steering system that includes micro-mechanical steering elements, about a center of the non-refracting surface to effect a predetermined field of regard.

In accordance with one or more aspects of the present disclosure the field of regard is between about ±70° and about a micro-radian.

In accordance with one or more aspects of the present disclosure the method further includes controlling a phase of the at least one optical beam with a linearly movable micro-electro mechanical mirror array, where each mirror in the micro-electro mechanical mirror array is independently movable.

In accordance with one or more aspects of the present disclosure the method further includes receiving a return signal with the rotationally symmetrical transmissive optical elements and directing the return signal to a detector.

In accordance with one or more aspects of the present disclosure the method further includes combining low power optical beamlets output by each of the rotationally symmetrical transmissive optical elements to form a high power optical beam.

In accordance with one or more aspects of the present disclosure a wide angle scanning system includes an optically variable micro-opto-electro-mechanical lens array including a plurality of rotationally symmetrical transmissive optical elements each having a non-refracting surface and a refracting surface; and a mechanical beam steering system including micro-mechanical steering elements, each being coupled to a respective one of the plurality of rotationally symmetrical transmissive optical elements and being configured to rotate a respective rotationally symmetrical transmissive optical element about a center of rotation that coincides with a center of the non-refracting surface, the mechanical beam steering system effecting a change in field of view from a wide angle search field of view to a focused field of view where the plurality of rotationally symmetrical transmissive optical elements are focused in a common predetermined direction within a total field of regard.

In accordance with one or more aspects of the present disclosure the wide angle search field of view is about ±70°.

In accordance with one or more aspects of the present disclosure the field of regard is about ±70°.

In accordance with one or more aspects of the present disclosure the mechanical beam steering system effects a transition between the wide angle search field of view and the focused field of view within about tens of microseconds.

In accordance with one or more aspects of the present disclosure the optically variable micro-opto-electro-mechanical lens array and the mechanical beam steering system comprise at least one conformal panel element, the at least one conformal panel element having a shape and size to effect conformal mounting of the at least one conformal panel on a vehicle.

In accordance with one or more aspects of the present disclosure the micro-mechanical steering elements rotate the respective one of the plurality of rotationally symmetrical transmissive optical elements to effect a wide angle search field of view or field of regard of about ±70° and a focused field of view of about less than a micro-radian.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A wide angle scanning system comprising:
a plurality of rotationally symmetrical transmissive optical elements each having a non-refracting surface and a refracting surface; and
a mechanical beam steering system including micro-mechanical steering elements, each being coupled to a respective one of the plurality of rotationally symmetrical transmissive optical elements for rotating a respective rotationally symmetrical transmissive optical element about a center of rotation that coincides with a center of the non-refracting surface.

2. The wide angle scanning system of claim 1, wherein the micro-mechanical steering elements rotate the respective one of the plurality of rotationally symmetrical transmissive optical elements to effect a field of view or field of regard having a solid angle of about ±70°.

3. The wide angle scanning system of claim 1, wherein the plurality of rotationally symmetrical transmissive optical elements comprise micro-opto-electro-mechanical systems.

4. The wide angle scanning system of claim 1, wherein the plurality of rotationally symmetrical transmissive optical elements and the mechanical beam steering system comprise at least one conformal panel element, the wide angle scanning system further comprising at least one laser source corresponding to each conformal panel element.

5. The wide angle scanning system of claim 1, wherein the plurality of rotationally symmetrical transmissive optical elements and the mechanical beam steering system comprise at least one conformal panel element, the wide angle scanning system further comprising at least one laser source that is common to the at least one conformal panel element.

6. The wide angle scanning system of claim 1, further comprising at least one laser source and at least one micro-mechanical system mirror, the at least one micro-mechanical system mirror being linearly movable to effect phase control of a laser beam emitted by the at least one laser source for entry into the a plurality of rotationally symmetrical transmissive optical elements.

7. The wide angle scanning system of claim 1, further comprising at least one laser source that effects creation of multiple beamlets for input into the plurality of rotationally symmetrical transmissive optical elements.

8. The wide angle scanning system of claim 1, further comprising a plurality of lenses coupled to the at least one laser source where each of the plurality of lenses directs a beamlet into the plurality of rotationally symmetrical transmissive optical elements.

9. The wide angle scanning system of claim 1, wherein the plurality of rotationally symmetrical transmissive optical elements form a first beam steering element, the wide angle scanning system including a plurality of rotational optical elements that form a second beam steering element.

10. A method for wide angle scanning comprising:
inputting at least one optical beam into a plurality of rotationally symmetrical transmissive optical elements, where the plurality of rotationally symmetrical transmissive optical elements are micro-opto-electro-mechanical elements each having a non-refracting surface and a refracting surface; and
steering the at least one optical beam with the plurality of rotationally symmetrical transmissive optical elements, with a mechanical beam steering system that includes micro-mechanical steering elements, about a center of the non-refracting surface to effect a predetermined field of regard.

11. The method of claim 10, wherein the field of regard is between about ±70° and about a micro-radian.

12. The method of claim 10, further comprising controlling a phase of the at least one optical beam with a linearly movable micro-electro mechanical mirror array, where each mirror in the micro-electro mechanical mirror array is independently movable.

13. The method of claim 10, further comprising receiving a return signal with the rotationally symmetrical transmissive optical elements and directing the return signal to a detector.

14. The method of claim 10, further comprising combining low power optical beamlets output by each of the rotationally symmetrical transmissive optical elements to form a high power optical beam.

15. A wide angle scanning system comprising:
an optically variable micro-opto-electro-mechanical lens array including a plurality of rotationally symmetrical transmissive optical elements each having a non-refracting surface and a refracting surface; and
a mechanical beam steering system including micro-mechanical steering elements, each being coupled to a respective one of the plurality of rotationally symmetrical transmissive optical elements and being configured to rotate a respective rotationally symmetrical transmissive optical element about a center of rotation that coincides with a center of the non-refracting surface, the mechanical beam steering system effecting a change in field of view from a wide angle search field of view to a focused field of view where the plurality of rotationally symmetrical transmissive optical elements are focused in a common predetermined direction within a total field of regard.

16. The wide angle scanning system of claim 15, wherein the wide angle search field of view is about ±70°.

17. The wide angle scanning system of claim 15, wherein the field of regard is about ±70°.

18. The wide angle scanning system of claim 15, wherein the mechanical beam steering system effects a transition between the wide angle search field of view and the focused field of view within about tens of microseconds.

19. The wide angle scanning system of claim 15, wherein the optically variable micro-opto-electro-mechanical lens array and the mechanical beam steering system comprise at least one conformal panel element, the at least one conformal panel element having a shape and size to effect conformal mounting of the at least one conformal panel on a vehicle.

20. The wide angle scanning system of claim 15, wherein the micro-mechanical steering elements rotate the respective one of the plurality of rotationally symmetrical transmissive optical elements to effect a wide angle search field of view or field of regard of about ±70° and a focused field of view of about less than a micro-radian.

* * * * *